United States Patent

Kuipers et al.

[11] Patent Number: 5,372,899
[45] Date of Patent: Dec. 13, 1994

[54] BATTERY HANDLE

[75] Inventors: Roy Kuipers, Rockwall; Margaret M. Wilson, Arlington, both of Tex.

[73] Assignee: AT&T Corp., Murray Hill, N.J.

[21] Appl. No.: 214,715

[22] Filed: Mar. 16, 1994

[51] Int. Cl.[5] .............................................. H01M 2/10
[52] U.S. Cl. .............................. 429/187; 16/DIG. 15; 294/156; 294/903
[58] Field of Search ................. 429/187, 121, 122, 96, 429/100; 16/DIG. 15, 125, 114 R, 114 B; 294/903, 149, 152, 156, 158

[56] References Cited

U.S. PATENT DOCUMENTS

| | | |
|---|---|---|
| 1,554,824 | 9/1925 | Knoblock . |
| 4,068,779 | 1/1978 | Canfield ........................ 16/114 B X |
| 4,374,188 | 2/1983 | Campbell et al. .................... 429/187 |
| 4,696,505 | 9/1987 | Shadoan .......................... 294/156 X |
| 4,791,702 | 12/1988 | McVey .................................. 16/125 |
| 4,832,393 | 5/1989 | Pitchford ............................. 294/156 |
| 5,027,874 | 7/1991 | Gazzola .......................... 190/115 X |
| 5,187,027 | 2/1993 | Larkin . |

Primary Examiner—Anthony Skapars
Attorney, Agent, or Firm—Alfred G. Steinmetz

[57] ABSTRACT

A battery support housing, as part of a battery handle arrangement, is provided to enclose a substantial portion of a batteries' outer casing. The housing includes a pair of arrayed slots in each of two opposing sides of the housing. A band of webbed material is continuously threaded through all the slots with a sufficient slack in the band between the upper pairs of slots at the two opposing ends to allow a hand grip of the band. The ends of the band are secured to the housing by circularly threading the band through adjacent slots in each of opposing sides of the housing by at least two turns.

12 Claims, 2 Drawing Sheets

INSIDE OF BATTERY SUPPORT HOUSING

BATTERY HANDLE

FIELD OF THE INVENTION

This invention relates to the transport of heavy batteries and in particular to a handhold mechanism for facilitating such transport.

BACKGROUND OF THE INVENTION

The transport of heavy batteries is at best a necessary inconvenience. The weight necessitates the use of hand grips or handles, but such hand grips or handles become an inconvenience once the battery is in its position of use. Either the handle is removable and subject to loss or distant placement or it consumes physical space in the environment of use of the battery.

SUMMARY OF THE INVENTION

According to the invention a handle is provided for transporting a battery substantially as claimed below.

In a particular embodiment a battery support housing is provided to enclose a substantial portion of the battery outer casing. The housing includes a pair of arrayed slots in each of two opposing sides. A ribbon or band of webbed material is continuously threaded through all the slots with a sufficient slack in the band of webbed material between the upper pairs of slots at the two opposing ends to allow a hand grip of the band of webbed material. The ends of the band of webbed material are secured to the housing by circularly threading the terminal ends of the band of webbed material through adjacent slots in each of the two opposing sides of the housing by at least two turns.

DETAILED DESCRIPTION

Figure 1:
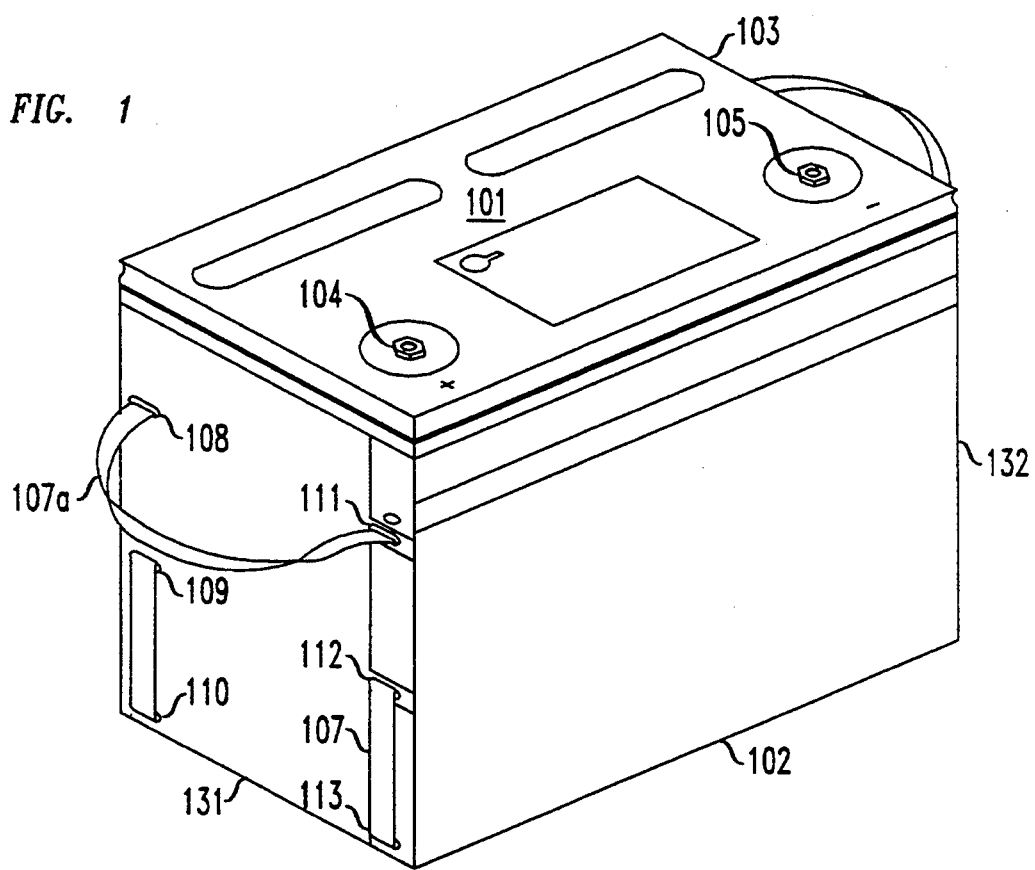
FIG. 1 is a pictorial schematic of a battery with a battery support housing with a band of webbing for providing a handle arrangement.

A battery 101, having a substantially parallelepiped shape, is shown included in a battery support housing 102 in FIG. 1. The top surface 103 of the battery 101 is exposed so that the electrical terminals 104 and 105 are exposed. A ribbon or band of webbed material 107 is interleaved through slots 108–114 included in opposing sides 131 and 132 of the battery support housing. The interweave of the band of webbed material 107 is taut with the exception of the portion 107a and 107b (not shown in the FIG. 1) of webbed material threaded between the slots 108 and 111 of side 131 and slots 114 and 117 of side 132 (FIG. 2) in order to provide two slack portions of the band of webbed material providing a handhold for enabling the transport of the battery 101 as enclosed in the battery support housing 102.

Figure 2:
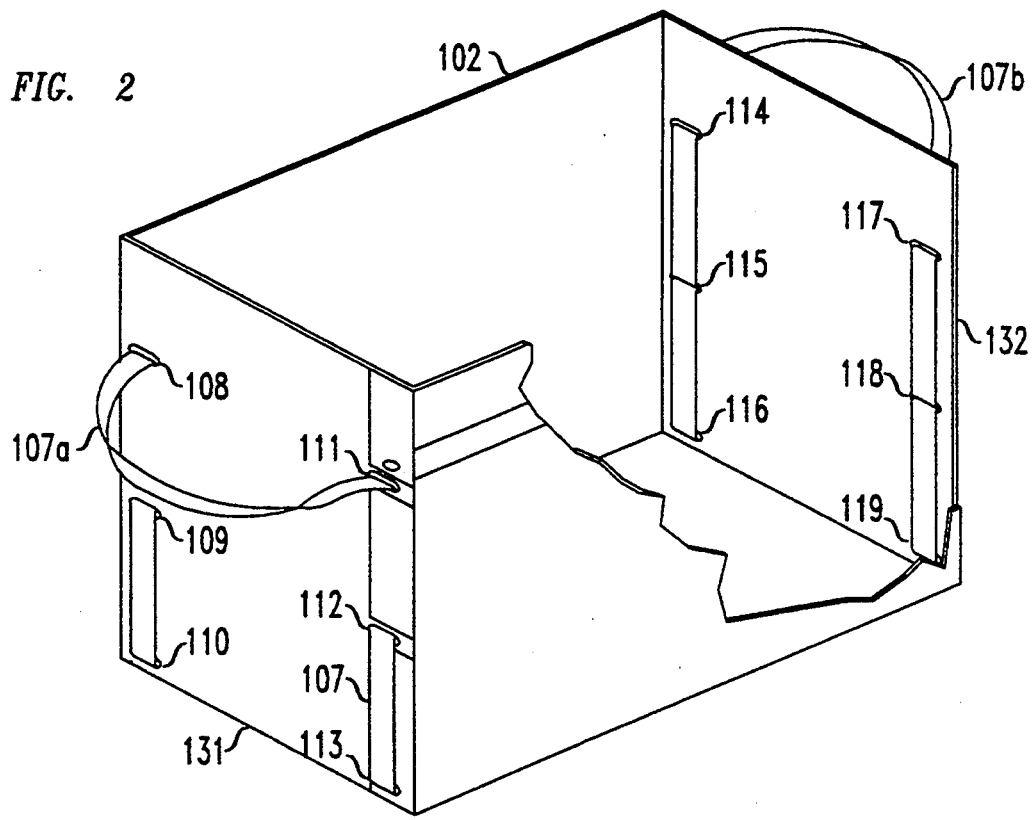
FIG. 2 is a pictorial schematic of the battery support housing with the included band of webbing for providing a handle arrangement.

The battery support housing 102 is shown in FIG. 2 without the battery being contained therein. The walls of the support housing are relatively thin so as to not add any significant size to the bulk of the final package including the battery. A pair of hand grips for transport of the package is provided by the slack in the band of webbing or webbed material as shown by the band portions 107a and 107b.

Figure 3:
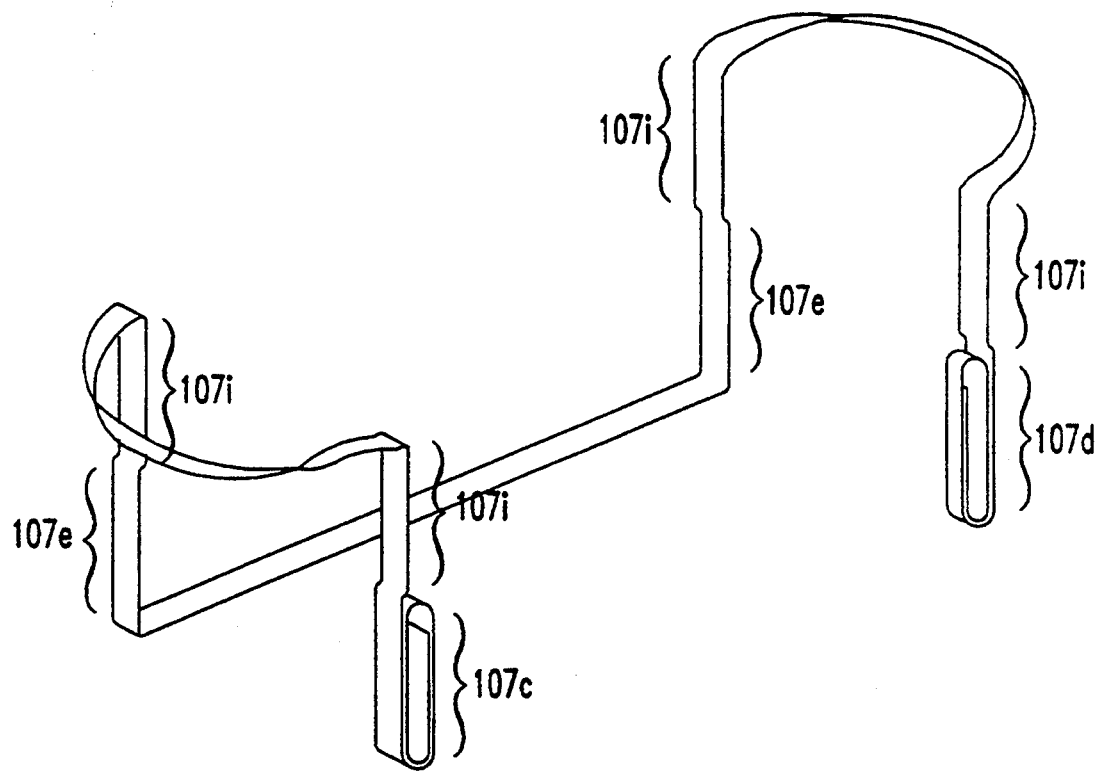
FIG. 3 is a pictorial schematic of the band of webbing shown alone but spatially oriented as if threaded into slots of the battery support housing.
Figure 4:
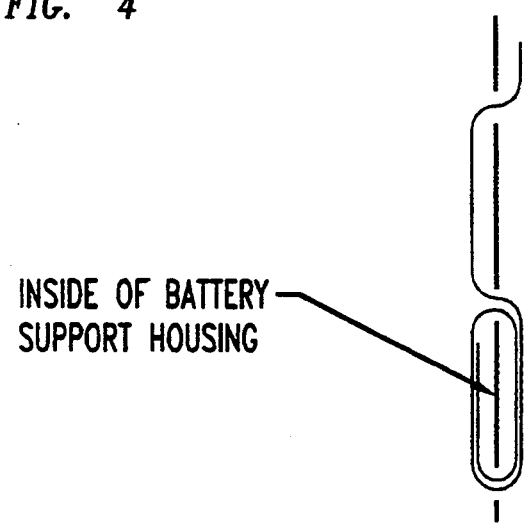
FIG. 4 is a detail schematic of an arrangement for securing the band of webbing to the battery support housing.

The overall contour of the threaded webbing is shown in the FIG. 3 and details of the securing of the webbing to end slots in the support housing is shown in the FIG. 4. As shown the threaded webbing is one continuous band of webbed material which is interlaced with the slots in the support housing. As shown the end portions 107c and 107d are interlaced with the wall of the support housing as shown in the FIG. 4. The band portions 107i are internal to the support housing and the portions 107e are external to the support housing as illustrative of the interleaving of the band. The band is secured to the support housing by circularly winding the band through two adjacent slots in the wall of the support housing by at least two turns as shown in the winding schematic of FIG. 4.

The material used for the webbed band 107 is KEVLAR (TM) aromatic polyamide fiber webbing material having significant tensile strength, very low electrical conductivity and resistance to flame and acid. Other materials of similar strength, electrical and durability characteristics may be used for this application. Other constructions of the band, such as an extruded ribbon, not comprising webbed material may be used as the band to supply the handgrip. Many variations of the invention will be readily apparent to those skilled in the art which do not depart from the spirit and scope of the invention.

We claim:

1. A handle arrangement for lifting and transporting a battery having a battery container defining its outer boundaries: comprising:

an outer hollow support casing having a hollow receptacle space with an internal boundary contour having a shape closely adhering to an external shape of the battery container and encompassing a substantial portion of the battery container;

a plurality of slots in a first and second pair of linear arrays of slots with each pair of linear arrays located in two opposing sides of the outer hollow support casing;

a handle strap configured as a narrow band of webbing threaded through the slots starting in a first two adjacent slots of the first pair of slots located in a first one of the opposing sides and circularly looped there through at least twice through the two adjacent slots and continuously threaded through the second of the first pair of the linear array of slots and continued through the hollow receptacle to the first pair of a linear array of slots located in a second one of the opposing sides and continuing to be looped in the second pair of the linear array of slots and concluding by being circularly looped at least twice through a final two slots in the second pair of linear arrays; and allowing slack in the handle strap at each opposing side for allowing the strap to be grasped for transport of the battery.

2. A handle arrangement for lifting and transporting a battery having a battery container as claimed in claim 1, wherein:

the band of webbing is fabricated from an aromatic polyamide fiber.

3. A battery handle arrangement for facilitating transport of a battery, comprising
- a battery support housing for enclosing a substantial portion of an outer casing of the battery;
- a first and second pair of linearly arrayed slots in each of opposing first and second sides of the battery support housing;
- a narrow band of webbing having a first and second end and continuously threaded through all the slots of both the opposing first and second sides of the battery support housing;
- the webbing threaded to allow sufficient slack in the webbing between selected slots in the first and second sides of the battery support housing to provide hand grips of the webbing;
- the first and second ends of the webbing secured to the housing by circularly threading the webbing through adjacent slots in each of opposing sides of the housing by at least two turns.

4. A handgrip transport arrangement for a battery, as claimed in claim 3:
- the band of webbing is fabricated from an aromatic polyamide fiber.

5. A handgrip transport arrangement for a battery, comprising:
- a support case for accepting a battery;
- a plurality of slots in at least two opposing walls of the support case;
- a band of webbing continuously threaded through all the slots of the opposing walls so as to alternate between an inside and outside of the support case;
- the band of webbing being threaded to allow two slack portions in the webbing between two slots at each of the two opposing walls and the band of webbing being taut between the balance of slots, whereby the slack portions serve as hand grips for facilitating transport of the battery in the support case.

6. A hand grip transport arrangement for a battery, as claimed in claim 5, wherein:
- terminal ends of the band of webbing are threaded through adjacent slots to secure the band of webbing to each of the two opposing walls of the support case.

7. A handgrip transport arrangement for a battery, as claimed in claim 6, wherein:
- the terminal ends of the band of webbing are threaded through adjacent slots by at least two turns.

8. A handgrip transport arrangement for a battery, as claimed in claim 7, wherein:
- the band of webbing is fabricated from an aromatic polyamide fiber.

9. A handgrip transport arrangement for a battery, comprising:
- a support case for accepting a battery;
- a plurality of slots in at least two opposing walls of the support case;
- a thin ribbon continuously threaded through all the slots of the opposing walls so as to alternate between an inside and outside of the support case;
- the thin ribbon being threaded to allow two slack portions in the ribbon between two slots at each of the two opposing walls and the ribbon being taut between the balance of slots, whereby the slack portions serve as hand grips for facilitating transport of the battery in the support case.

10. A handgrip transport arrangement for a battery, as claimed in claim 9, wherein:
- the thin ribbon comprises a band of webbed material.

11. A handgrip transport arrangement for a battery, as claimed in claim 9, wherein:
- terminal ends of the ribbon are threaded through adjacent slots to secure the ribbon to each of the two opposing walls of the support case.

12. A handgrip transport arrangement for a battery, as claimed in claim 11, wherein:
- the terminal ends of the ribbon are threaded through adjacent slots by at least two turns.

* * * * *